(12) United States Patent
Drees (10) Patent No.: US 6,185,483 B1
(45) Date of Patent: *Feb. 6, 2001

(54) REAL-TIME PRICING CONTROLLER OF AN ENERGY STORAGE MEDIUM

(75) Inventor: Kirk H. Drees, Cedarburg, WI (US)

(73) Assignee: Johnson Controls, Inc., Milwaukee, WI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/013,737

(22) Filed: Jan. 27, 1998

(51) Int. Cl.$^7$ .................................................. G05D 11/00
(52) U.S. Cl. ............................ 700/295; 700/291; 702/61
(58) Field of Search ................................... 700/291, 295; 702/61

(56) References Cited

U.S. PATENT DOCUMENTS

| | | | |
|---|---|---|---|
| 4,166,975 | * | 9/1979 | Germer et al. .................... 324/116 |
| 4,283,772 | * | 8/1981 | Johnston ............................ 713/600 |
| 4,755,924 | * | 7/1988 | Hiroi ..................................... 700/54 |
| 5,229,713 | * | 7/1993 | Bullock et al. .................... 324/142 |
| 5,274,571 | * | 12/1993 | Hesse et al. ....................... 700/291 |
| 5,467,265 | * | 11/1995 | Yamada et al. ..................... 700/49 |
| 5,479,358 | * | 12/1995 | Shimoda et al. .................. 700/291 |
| 5,873,251 | * | 2/1999 | Iino ..................................... 60/660 |
| 6,021,402 | * | 2/2000 | Takriti .............................. 705/412 |

OTHER PUBLICATIONS

Seem, J.E., et al., "Adaptive Methods for Real–Time Forecasting of Building Electrical Demand," ASHRAE Transactions, vol. 97, Pt. 1, pp. 710–721.
MacArthur, J.W., et al., "On–Line Recursive Estimation for Load Profile Prediction," ASHRAE Transactions, vol. 95, Pt. 1, 1989, pp. 621–628.
Forrester, J.R., et al., "Formulation of a Load Prediction Algorithm for a Large Commercial Building," ASHRAE Transactions, vol. 90, Pt 2B, 1984, pp. 536–551.
Kreider, Jan F., et al., "Predicting Hourly Building Energy Usage," ASHRAE Journal, vol. 36, Jun. 1994, pp. 72–81.

(List continued on next page.)

Primary Examiner—William Grant
Assistant Examiner—Zoila Cabrera
(74) Attorney, Agent, or Firm—Quarles & Brady LLP (57) ABSTRACT

A method and apparatus is provided for controlling an energy storage medium connected to an environmental control system that is providing environmental conditioning. The controller includes an energy pricing data structure for storing a real-time energy pricing profile indicative of energy rates corresponding to time-varying production costs of energy. The controller also includes a storage medium containing rules that approximate optimal control trajectories of an energy cost function that is dependent upon the real-time energy pricing profile, with the rules governing the operation of the energy storage medium. In addition, the controller has an engine for generating a storage medium control signal based upon the real-time energy pricing profile and the rules whereby the energy storage medium is controlled with the storage medium control signal in order to minimize energy costs associated with environmental control system.

25 Claims, 6 Drawing Sheets

OTHER PUBLICATIONS

Braun, J.E., "A Comparison of Chiller–Priority, Storage–Priority, and Optimal Control of an Ice–Storage System," ASHRAE Transactions, vol. 98, Pt. 1, 1992, pp. 893–902.

Dees, Kirk et al., "Development and Evaluation of a Rule–Based Control Strategy for Ice Storage Systems," Int. Jl. of Heating, Ventilating, Air–Conditioning and Refrigerating Research, vol. 2, No. 4, Oct. 1996, pp. 312–336.

Drees, Kirk et al., "Modeling of Area–Constrained Ice Storage Tanks," Intl. Jl. of Heating, Ventilating, Air–Conditioning and Refrigerating Research, vol. 1, No. 2, Apr. 1995, pp. 143–159.

Daryanian, Bahman, et al., "Minimum–Cost Control of HVAC Systems Under Real Time Prices," IEEE Proceedings, vol. 3, 1994, pp. 1855–1860.

Smith, Stephen, "A Linear Programming Model for Real–Time Pricing of Electric Power Service," Operations Research, vol. 41, No. 3, May–Jun. 1993, pp. 470–483.

David, A.K., et al., "Consumer Rationality Assumptions in the Real–Time Pricing of Electricity," IEE Proceedings, vol. 139, No. 4, Jul. 1992, pp. 315–322.

Daryanian, B., et al., "RTP–Based Energy Management Systems: Monitoring, Communication, and Control Requirements for Buildings Under Real–Time Pricing," ASHRAE Transactions, vol. 98, Pt. 1, 1992, pp. 1160–1170.

* cited by examiner

REAL-TIME PRICING CONTROLLER OF AN ENERGY STORAGE MEDIUM

BACKGROUND OF THE INVENTION

1. Field of the Invention

The present invention generally relates to energy storage mediums, and more particularly to a real-time pricing controller and corresponding method for controlling an energy storage medium that is connected to an environmental control system.

2. Description of Related Art

Many electric utility companies are unable to generate enough electricity through conventional means to meet peak customer demand. Because of the enormous capital and environmental costs associated with building new power plants, these utilities offer incentives to their customers to reduce peak electrical consumption. These utility incentives encourage electrical consumers to shift energy consumption to those periods when reserve generating capacity is available. The incentives are typically provided in the form of an energy rate structure, and the real-time pricing (RTP) structure is rapidly gaining popularity.

Figure 1:
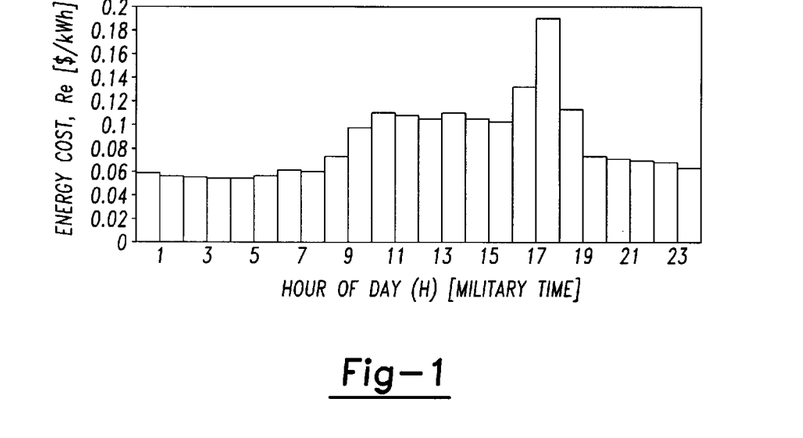
FIG. 1 is an example of a day-ahead real-time pricing schedule.

RTP is a time-varying energy rate that takes into account the time-dependent variation in the cost of producing electricity. With a RTP structure, utility companies can adjust energy rates based on actual time-varying marginal costs, thereby providing an accurate and timely stimulus for encouraging customers to lower demand when marginal costs are high. An example of an RTP rate structure for a 24 hour period is shown in FIG. 1.

RTP differs from traditional time-of-day (TOD) or time-of-use (TOU) power rates in two primary ways. First, the demand charge of a TOD or TOU energy pricing structure is either eliminated or greatly reduced. Secondly, the rates in an RTP scheme may be altered more frequently (e.g., every hour) and with much less prior notice (i.e., one day or less).

When RTP is in use, a utility cost schedule for a given time interval is periodically provided to utility customers. Generally, the price schedule is provided the day before (day-ahead) or hour before (hour-ahead) the rate will take effect. In day-ahead pricing, utility customers are given price levels for the next day, and in hour-ahead pricing the customer receives the energy prices for the next hour.

In order for a utility customer to benefit from RTP, short-term adjustments must be made to curtail energy demands in response to periods with higher energy prices. One method of accomplishing this objective is by supplementing environmental conditioning systems with energy storage mediums. With these energy storage devices, external power consumption is decreased by drawing upon the energy reserves of the energy storage medium during periods having higher energy rates and generating energy reserves during intervals with lower energy prices.

To obtain the maximum benefit from RTP, a system must have access to energy demand and consumption information. Furthermore, the ability to project future load requirements is generally necessary. However, because energy prices of a RTP pricing structure change frequently and energy usage continually varies, an RTP cost function must be constantly minimized in order for a utility customer to receive the available cost savings. The discrete RTP cost function is given by $$J_{RTP} = \sum_{K=1}^{S} [Re * P]_K * \Delta t \quad (1)$$

where:
- K is an interval of the RTP schedule;
- $P_k$ is the average electrical power (kW) consumed during interval k;
- $J_{RTP}$ is the cost to the customer;
- $Re_k$ is the energy cost during interval k (which is typically adjusted 24 times daily as shown in FIG. 1);
- $\Delta t$ is an interval duration; and
- S is the number of intervals in the optimization time horizon.

Note that in subsequent discussions, the stage K will be replaced with an H to denote the hour of the day (in military time) since a typical interval length is one hour. However, it should be noted that the control strategy is appropriate for any interval length as long as the demand charge has been eliminated or reduced.

The state and control variable trajectories that minimize the RTP cost function can be found analytically (See L. S. Pontryagin, V. G. Boltyanskii, R. V. Gamkrelidze, and E. F. Mishchenko, "The Mathematical Theory of Optimal Process," Wiley-Interscience (1962)), numerically (See R. Bellman, "Dynamic Programming," Princeton University Press (1957)), or with genetic algorithms (See D. E. Goldberg, "Genetic Algorithms in Search, Optimization & Machine Learning," Addison-Wesley Publishing Company, Inc. (1989)), respectively. Unfortunately, each of these approaches requires significant expertise to formulate solutions and mathematically implement. In addition, a significant amount of computer resources (including memory) are required to generate a solution. Therefore, it is typically impractical to solve the optimal control problem of an energy storage medium in real time using realistic non-linear component models.

In view of the foregoing, it is one object of the present invention to provide a controller of an energy storage medium that minimizes the integrated cost function of a real-time-pricing utility service yet is simple to implement, computationally efficient, requires minimal memory, and is robust. Furthermore, additional advantages and features of the present invention will become apparent from the subsequent description and claims taken in conjunction with the accompanying drawings.

SUMMARY OF THE INVENTION

An apparatus and method is provided for controlling an energy storage medium connected to an environmental control system that is providing environmental conditioning. The controller includes an energy pricing data structure for storing a real-time energy pricing profile indicative of energy rates corresponding to time-varying production costs of energy. The controller also has a storage medium containing rules that approximate optimal control trajectories of an energy cost function that is dependent upon the real-time energy pricing profile and governs the operation of the energy storing medium. A engine is provided for generating a storage medium control signal based upon the real-time energy pricing profile and the rules. Whereby, the energy storage medium is controlled with the storage medium control signal in order to minimize energy costs associated with environmental conditioning by the environmental control system.

BRIEF DESCRIPTION OF THE DRAWINGS

Other objects and advantages of the invention will become apparent upon reading the following detailed description and upon reference to the follow drawings, in which.

DESCRIPTION OF THE PREFERRED EMBODIMENT

The following description of the preferred embodiment is mainly exemplary in nature and is in no way intended to limit the invention or its application or uses.

Figure 2:
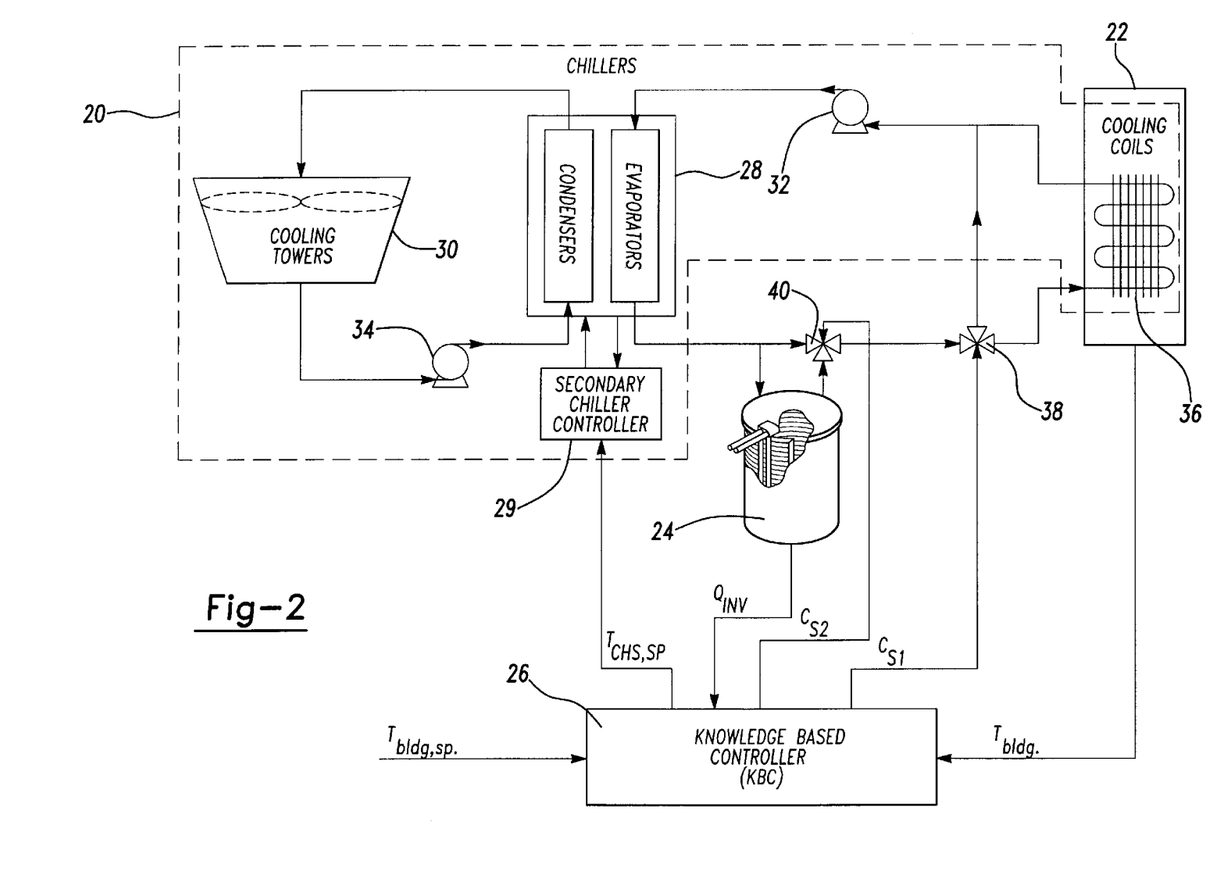
FIG. 2 is an environmental control system having an energy storage medium for use with the knowledge based controller of the present invention.

FIG. 2 shows an environmental control system in the form of an air conditioning system 20 that is providing environmental conditioning of a building 22 in conjunction with an energy storage medium 24 that is controlled by a knowledge based controller 26 of the present invention. The air conditioning system 20 includes a water chilling unit 28, secondary chiller controller 29, cooling towers 30, a secondary fluid distribution pump 32, a condenser water pump 34, and cooling coils 36 contained within the building 22.

During a cooling cycle of the air conditioning system 20, an approximately 25 percent glycol and water mixture (brine) is distributed between the water chilling unit 28, energy storage medium 24 and cooling coils 36. More particularly, the brine is chilled by water chilling unit 28 and pumped through or around the energy storage medium 24 and then to the cooling coils 36 of the building 22.

The energy storage medium 24 is a thermal energy storage (TES) tank. More particularly, the TES tank 24 is an internal melt, ice-storage tank. This common design has tightly spaced, small diameter tubes arranged in a parallel flow geometry surrounded by water and/or ice within a cylindrical tank. During either TES charging (i.e., ice making) or TES discharging (i.e., ice melting) cycles, the brine is pumped through the small diameter tubes of the tank 24.

Charging of the TES 24 is accomplished by completely closing the load bypass valve 38 to the building cooling coils 36 and fully opening the storage control valve 40 to the ice-storage tank 24. In this mode, all the secondary fluid flows through the storage tank 24 at temperatures low enough to make ice within the tank 24. The discharging of the TES tank 24 occurs when the load bypass valve 38 is fully open to the building cooling coils 36. During a discharge of the tank 24, storage control valve 40 modulates the mixture of flow from the tank 24 and chiller 28 in order to produce brine having a desired temperature.

The chiller 28 is a factory assembled unit designed for an ice storage application and is equipped with a brine supply temperature setpoint reset capability. The chiller 28 is located upstream of the storage medium 24 to permit chiller 28 operation at the maximum efficiency. This arrangement provides a higher chiller coefficient of power (COP) for a given load as compared to locating the chiller downstream of the storage medium 24. This is due to an inverse relationship between chiller power consumption and chiller water supply temperature.

Obtaining the maximum benefit from the air conditioning system 20 and ice storage tank 24 involves scheduling a portion of the building cooling load to the storage medium 24 during high energy cost periods and extracting energy from the storage medium 24 when the cost of energy is lower. Therefore, the ultimate objective is to exploit the lower utility rates that are provided by the utility as a financial incentive to shift energy loads from high demand periods.

The knowledge based controller (KBC) 26 uses a set of predetermined heuristic rules to exploit the lower utility rates in a RTP tariff. The KBC 26 controls the water chilling unit 28, load bypass valve 38 and storage control valve 40 based on these rules, state variables, and additional inputs that will be subsequently discussed. The advantage of the KBC 26 is that it is simple to implement, computationally efficient, requires minimal computer memory, and is very robust.

The heuristic rules of the KBC 26 were obtained by solving the optimal control problem off-line with a work station for a wide variety of input ranges and system types using dynamic programming as described in "Dynamic Programming", R. Belman, Princeton University Press, Princeton, N.J. (1957). Dynamic Programming was selected because state and control variable constraints are easily implemented, a global minimum is assured, and the algorithm is extremely robust since derivative evaluations are not required. The rules were identified by noting common characteristics of the optimal control trajectories. In effect, the optimal control trajectories were used to provide the input required by the KBC.

Figure 3:
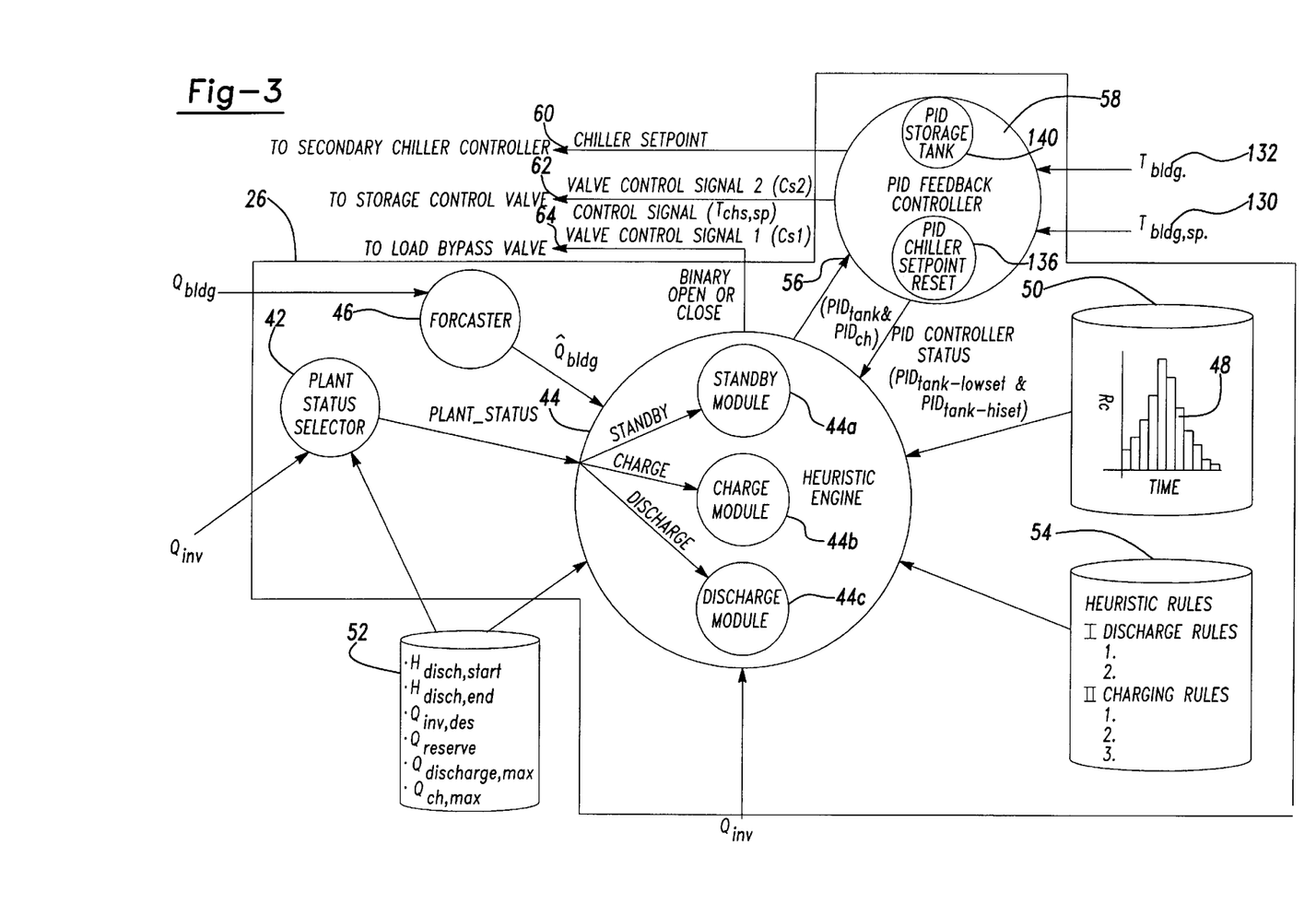
FIG. 3 is the knowledge based controller of the present invention in further detail.

FIG. 3 shows the controller 26 in further detail. As can be seen, the KBC 26 includes a plant status selector 42, heuristic engine 44, forecaster 46, PID feedback controller 58 and a pricing profile 48 indicative of energy rates corresponding to time varying production costs of energy that is stored in an energy pricing data structure 50. The heuristic engine 44 receives an estimate of the facility heat transfer rate ($\dot{Q}_{bldg}$) from the forecaster 46 that is obtained from past plant flow and temperature measurements via energy balance. In addition, the heuristic engine 44 receives input facility specific data 52 such as equipment capacity, maximum charging/discharging rates for the TES, charging/discharging schedules, and desired capacity reserves. Furthermore, the heuristic engine 44 utilizes the heuristic rules 54 developed with the dynamic programming technologies as previously indicated.

The heuristic rules are built upon the following discharging and charging rules and assumptions:

Discharging rules:

1) Starting with the time interval (typically hourly) corresponding to the highest energy costs (Re), satisfy as much of the building load ($Q_{bldg}$) during that time interval as possible by discharging the thermal storage; and 2) Repeat step 1 for the next highest energy cost interval, until the storage capacity is depleted or the building cooling load requirements approach zero.

Charging Rules:
1) Always charge at the maximum rate;
2) Only charge storage during the customer specified charging period; and
3) Stop charging sooner if storage is recharged to maximum specified limit.

Assumptions:
1. It is beneficial to completely discharge the TES inventory (if possible) during the planning horizon;
2. The sensitivity of the controller to chiller efficiency over the expected load and environmental conditions is negligible compared to other measurements, forecasts and modeling errors;
3. Charging is not allowed during the discharge planning horizon; and
4. There is no period during the discharge planning horizon when it is not beneficial to use TES in preference to the chiller.

It should be noted that a thermal load forecasting algorithm is needed to produce an estimate of the facility heat transfer rate $\hat{Q}_{bldg}$. This is necessary to ensure that the storage medium has the capacity available for high energy cost periods. Otherwise, the storage medium could be prematurely depleted and the cooling requirements would not be satisfied. Such a forecasting algorithm is provided in "Adaptive Methods for Real-Time Forecasting of Building Electrical Demand", ASHRAE Transactions, Vol. 97, Part 1, Seem, J. E., and J. E. Braun, 1991, which is hereby incorporated by reference.

Based upon these basic rules and assumptions, the heuristic engine 44 generates either setpoint adjustment or output override commands 56 that are provided to the PID feedback controller which uses these signals to regulate the capacity of the chiller 60 and storage tank 64. In many installations the load bypass valve is also modulated in response to a binary control signal. This first valve control signal ($C_{s1}$) (62) is a two position signal which either fully opens or closes the load bypass valve depending on the plant status.

The PID feedback controller 58 produces the control signals (60, 64) necessary to operate the setpoint of the chiller and storage control valve. In this description, the TES capacity is varied by adjusting the chiller setpoint temperature with the chiller setpoint control signal ($T_{chs,sp}$) 60 and modulating the storage control valve with the second valve control signal ($C_{s2}$) 64, respectively.

Figure 4:
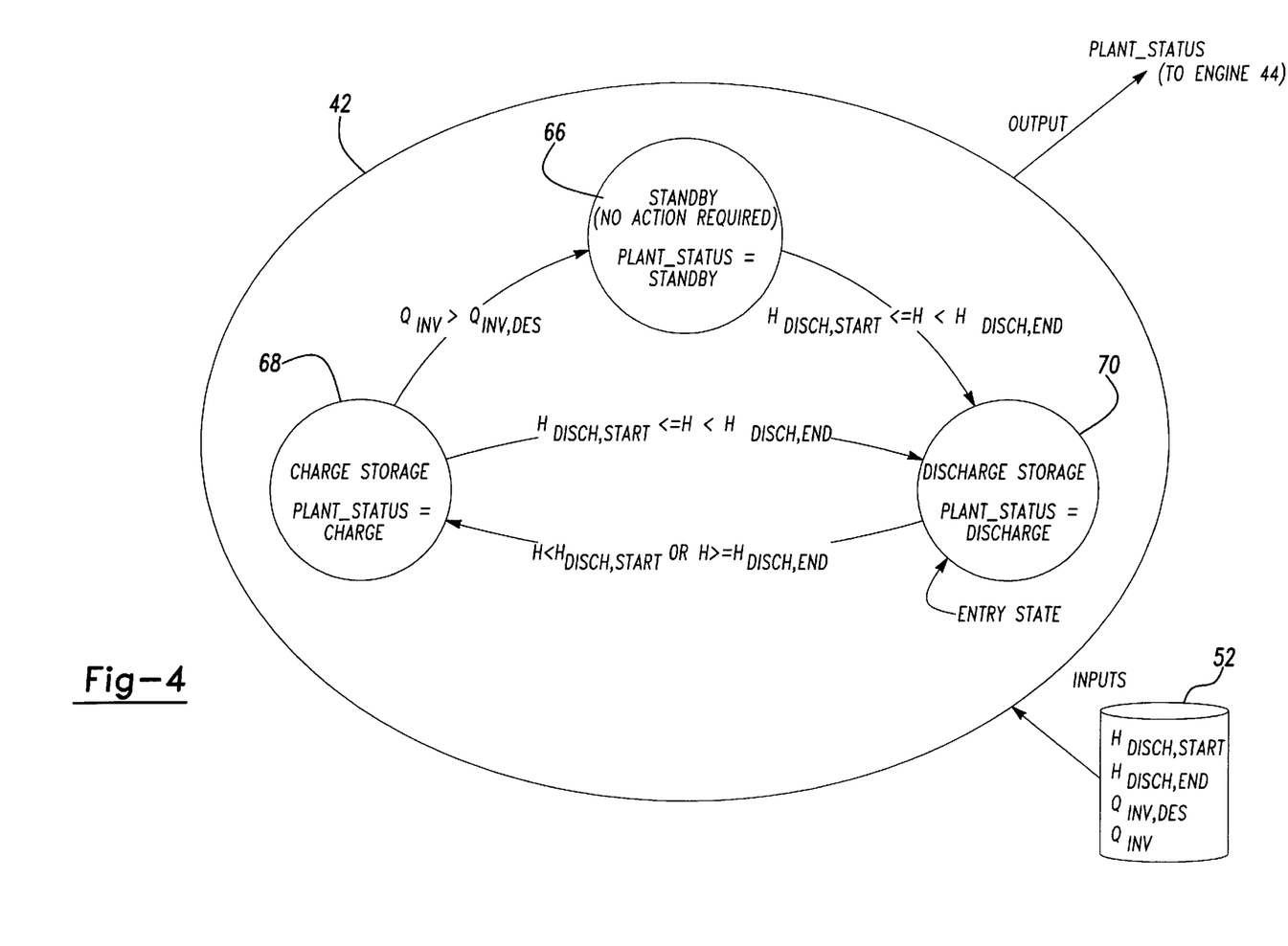
FIG. 4 is the plant status selector of the knowledge based controller in further detail.

FIG. 4 shows the plant status selector 42 of the KBC in further detail. The state transitions of the plant status selector 42 depend upon the customer specified discharge interval (i.e., hour to begin discharge ($H_{disch,\ start}$) and hour to end discharge ($H_{disch,\ end}$)), the TES state of charge (i.e., current measured storage inventory ($Q_{inv}$)), and the design capacity of the thermal storage medium ($Q_{inv.\ des}$)). Based upon these inputs, the plant status selector 42 will select a standby state 66, charge state 68, or discharge state 70. The selected state (i.e., plant_status) is then transmitted to the heuristic engine which operates in a charge mode, discharge mode or standby mode based upon this input.

The entry state of the plant status selector 42 is the discharge storage state 70. The plant status selector 42 will remain in the discharge storage state 70 until the current hour (H) is outside of the customer specified discharge interval (i.e., $H<H_{disch,start}$ or $H>=H_{disch,end}$). Once this condition is found to exist, a state transition from the discharge storage state 70 to the charge storage state 68 occurs.

As the plant status selector 42 remains in the charge state 68, the TES state of charge will increase. Once the TES is fully charged (i.e., $Q_{inv}>Q_{inv,des}$), the plant status selector 42 will transition to the standby state 66. Alternatively, the plant status selector 42 will exit the charge storage state 68 and return to the discharge storage state 70 if the specified discharge interval is entered (i.e., $H_{disch,\ start}<=H<H_{disch,\ end}$). Furthermore, if the plant status selector 42 is in the standby status 66, a transition to the discharge storage state 70 will occur if the current hour (H) is within the customer specified discharge interval (i.e., $H_{disch,start}<=H<H_{disch,end}$).

As previously indicated, the plant status selector 42 transmits the plant status (i.e., plant_status) to the heuristic engine which executes a charge module, discharge module, or standby module based upon this input. Referring to FIG. 3, the heuristic engine 44 executes a standby module 44a if the plant status is "standby", a charge module 44b if the plant status is "charge", and a discharge module 44c if the plant status is "discharge." When the heuristic engine 44 executes the charge module 44b, the chiller is run at maximum capacity with a low set point as required to recharge the TES tank. This is accomplished by overriding the load bypass valve command 62 so that the building cooling coils 36 are bypassed, overriding the storage control valve command 64 so that all flow passes through the storage tank 24, and overriding the chiller setpoint controller output 60 to provide the lowest possible setpoint to the chiller control panel 29.

Execution of the standby module 44a results in the termination of brine flow through the TES storage tank. If the building heat load is minimal, the chiller operation will also be minimized or chiller operation will be terminated. These actions are accomplished by overriding the load bypass valve command 62 so that flow can circulate through the building cooling coils 36, overriding the storage control valve command 64 so that all flow bypasses the tank, releasing any overrides on the chiller setpoint controller output 60 so that it will attempt to satisfy the building secondary supply temperature setpoint 130.

The steps performed by the discharge module 44c are more complicated than the process of the charge module 44b and standby module 44a as the capacity of the TES and chiller must be coordinated to maximize the TES discharge rate when the energy costs are high, yet TES must not be prematurely depleted.

The discharge module 44c uses the known future energy costs (Re) as provided by the utility company, but possibly forecasted, forecasted facility heat transfer rate ($\hat{Q}_{bldg}$), an estimate of maximum storage discharge capacity, scheduling information, and knowledge of the maximum chiller capacity to determine whether the use of storage should be maximized or minimized for the upcoming hour. The discharge module also estimates whether storage should be maximized or minimized for each of the remaining hours of the customer discharge interval.

Figure 5:
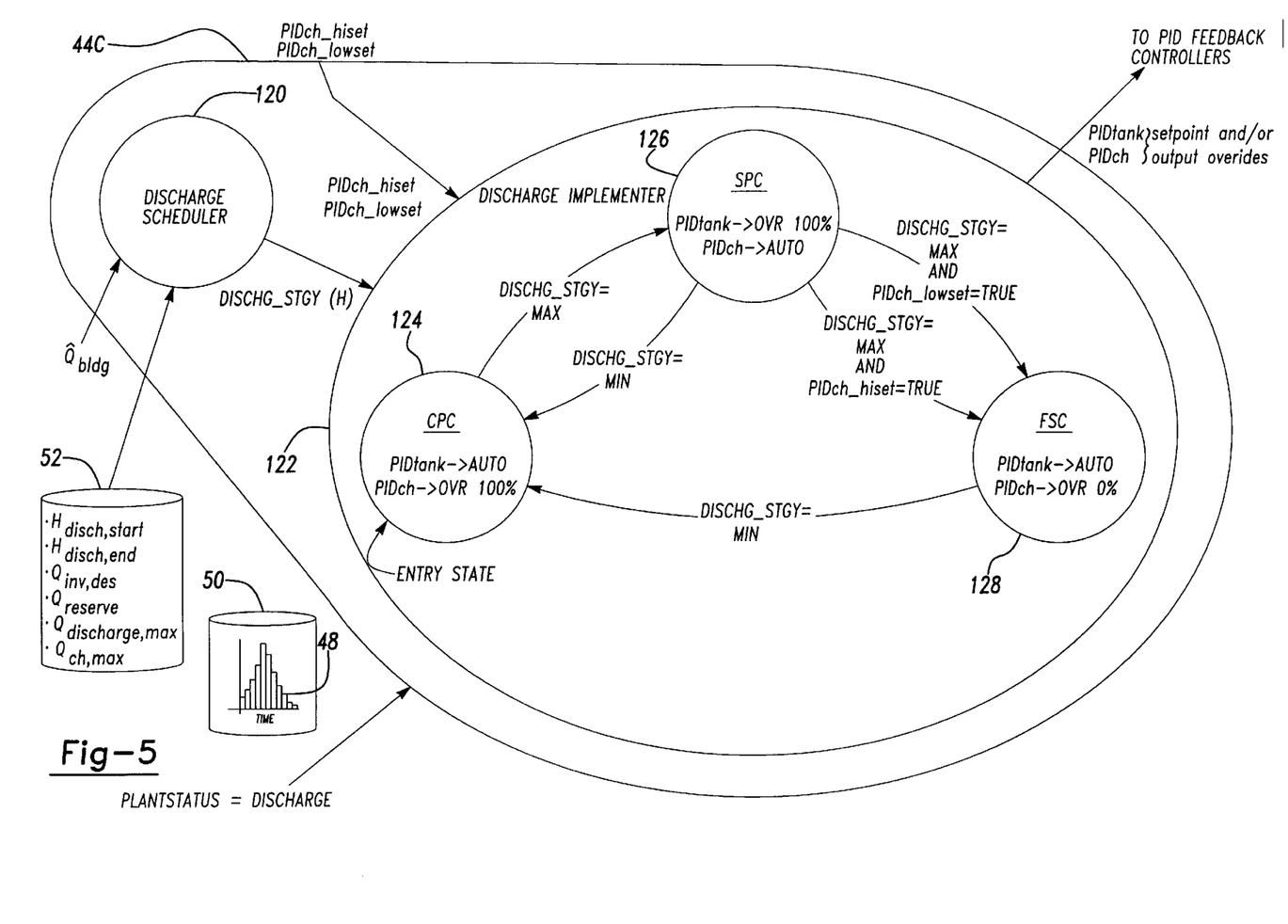
FIG. 5 is the discharge module of the knowledge based controller in further detail.

FIG. 5 shows the discharge module 44c in further detail. The discharge module 44c is executed hourly to take advantage of accuracy improvements in the forecaster as the day progresses and also to account for error in the maximum storage discharge capacity estimated during the previous interval.

Figure 6:
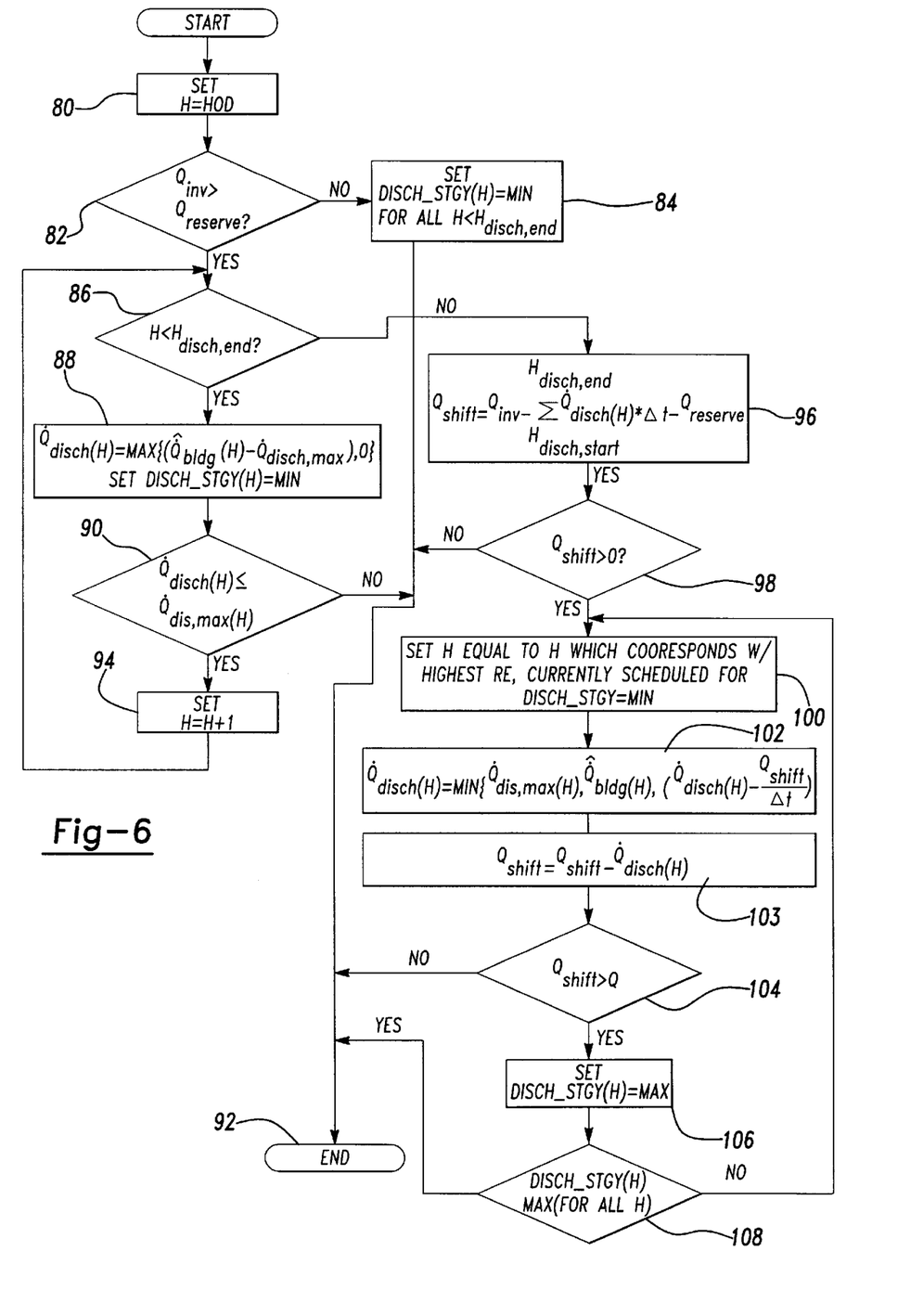
FIG. 6 is a flow chart that illustrates the procedure used by the discharge scheduler of the knowledge based controller.

A discharge scheduler 120 determines a discharge schedule (Dischg_STGY(H)). The discharge schedule that is provided to a discharge implementer 122 which selects the appropriate chiller/storage priority control strategy and issues the appropriate overrides and/or setpoint changes to PIDtank and PIDch needed to achieve this selected control strategy. The procedure utilized by the discharge scheduler to determine a discharge schedule attempts to mimic the performance of an optimal controller by scheduling the highest possible TES discharge rates when the electrical costs are highest without prematurely depleting the storage. FIG. 6 shows the preferred procedure of the discharge scheduler 120.

Referring to FIG. 6, the procedure of the discharge scheduler begins by setting the current hour variable (H) to the current hour of the day (HOD) 80. As some system users may choose to hold a portion of the tank inventory in reserve as a safety factor that ensures the tank is not prematurely depleted due to forecasting errors, etc., a comparison is made between the measure tank inventory ($Q_{inv}$) and the amount of tank inventory that is to held in reserve ($Q_{reserve}$) 82. If the measured tank inventory is less that the amount of tank inventory to be held in reserve (i.e., $Q_{inv} \ngtr Q_{reserve}$), a minimum discharge strategy is selected for all of the remaining hours of the discharge period 84. In the event that sufficient TES inventory is available (i.e., $Q_{inv} > Q_{reserve}$), the discharge scheduler proceeds to identify an appropriate schedule.

Initially, a determination is made as to whether the current hour (H) is outside the scheduled discharge interval 86. This is accomplished by comparing the current hour (H) to the hour that corresponds to the user specified end of the discharge interval ($H_{disch,end}$). If the current hour (H) is within the discharge interval, the minimum rate at which heat may be transferred into the TES ($_{disch}$) is identified, if any, and the discharge strategy is set to a minimum 88. The calculation in (88) determines the minimum amount of storage required to supplement the chiller so that the building load requirement can be met for hour (H).

Once the scheduled heat transfer rate ($Q_{disch}$ (H)) and strategy selection for the current hour is completed 88, the scheduled heat transfer rate is compared to the maximum discharge rate ($Q_{disch, max}$ (H)) 90. The maximum discharge rate is a function of the TES tank design, fluid temperature entering the tank, and the inventory for the ice storage tank. Therefore, if the scheduled transfer rate ($Q_{disch}$) (H)) exceeds the maximum discharge rate ($Q_{disch,max}$ (H)), the building load cannot be met and the control logic exits the procedure 92. Otherwise, the current hour variable (H) is incremented 94, and the determination as to whether the current hour (H) is outside of the discharge interval 86 is repeated.

If the current hour is initially found to be found to outside the discharge period, or this condition exists during a subsequent pass through the procedure, the amount of TES capacity available to shift loads ($Q_{shift}$) is calculated 96. This extra capacity (over what is needed to satisfy the load constraints) is then scheduled (blocks 100–108), so that the daily energy costs will be minimized. The amount of TES energy available for load shifting can then be used to reduce the chiller capacity during periods of high energy prices (i.e., to load shift).

After the amount of TES capacity that is available for load-shifting is calculated, and the determination is made that at least some capacity is available 98, the hour having the highest energy cost (Re) currently scheduled for minimum discharge strategy is identified 100. Once this identification is made, the TES discharge rate for that identified hour ($Q_{disch}$ (H)) is calculated (102) assuming that as much of the building load as possible should be provided by the storage tank 24.

In addition, the amount of TES capacity that may be used to load shift $Q_{shift}$ is updated to reflect the energy that is scheduled for use in the previous step (103).

If there is sufficient energy remaining for load shifting (i.e., $Q_{shift} > 0$) 104 a maximum discharge strategy is selected 106. This is followed by a determination as to whether all of the hours of the discharge period have been scheduled for a maximum discharge 108 (i.e., the storage inventory exceeds the integrated cooling load). If a maximum strategy is selected for the entire discharge period, the process is terminated 92, otherwise the hour with the next highest energy cost (Re) currently scheduled for a minimum discharge period is selected 100 and the foregoing process continues until the amount of energy available for load shifting has been depleted 104 or a maximum discharge strategy has been selected for the entire discharge period 108.

As previously indicated and as can be seen in FIG. 5, once the discharge scheduler 120 has determined the discharge strategy, the appropriate priority control for the current hour is selected by the discharge implementer 122. The discharge implementer 122 has three priority control states that correspond to three discharge strategies, namely, a chiller priority control (CPC) state 124, a storage priority control (SPC) stater 126, and a full storage control (FSC) state 128 that corresponds to a chiller priority control (CPC) strategy, storage priority control (SPC) strategy, and a full storage control (FSC) strategy, respectively.

The CPC state 124 is the entry state and in this mode the attempt is made to satisfy the entire building load with the chiller only. In this state, thermal storage is utilized only when the building cooling load requirements exceeds the maximum chiller capacity. This is accomplished by overriding the primary loop feedback controller output so that it provides (20) with a chiller supply temperature equal to the minimum discharge value and places the primary feedback loop in automatic (PIDch→AUTO). If the discharge scheduler 120 provides that the discharge strategy is set to maximum, the transition from the CPC strategy 124 occurs and the SPC strategy 126 is implemented.

In the SPC state 126, an emphasis is placed on satisfying the building cooling load by transferring heat into the thermal storage medium. This is accomplished by overriding the TES feedback loop to one hundred percent (PIDtank→100%) and placing the primary feedback loop which determines the chiller supply setpoint in automatic (PIDCH→AUTO). The SPC strategy 126 will continue until a minimum discharge strategy is provided by the discharge scheduler 120 or the selected discharge strategy continues to be a maximum strategy and PIDch_lowsat is set to true by the PID feedback controller. The value of $PID_{ch}$ _lowsat will be true whenever the chiller capacity is either zero or at a very low value. This represents a case when the chiller is probably no longer needed to satisfy the building cooling load. Once the discharge strategy is set to maximum and the PIDch_lowsat is set to true, the discharge implementator 122 transitions from the SPC state to the FSC state 128.

In the FSC state 128 the thermal storage medium is used to satisfy as much of the cooling load as possible. This is accomplished by minimizing the chiller capacity (PIDch→0%) and placing the storage valve feedback loop in automatic (PIDtank→AUTO). The discharge implementation remains in the FSC state 128 until the discharge strategy is set to minimum or the discharge strategy remains at maximum and the PIDtank_hiset is set to true. If $PID_{tank}$_hisat is true then the tank does not have adequate discharge capacity to meet the building cooling load.

Once the discharge implementer selects the appropriate control strategy and the PIDtank and PIDch values are appropriately configured, the PIDtank and PIDch values are transmitted to the PID feedback controller implemented.

Figure 7:
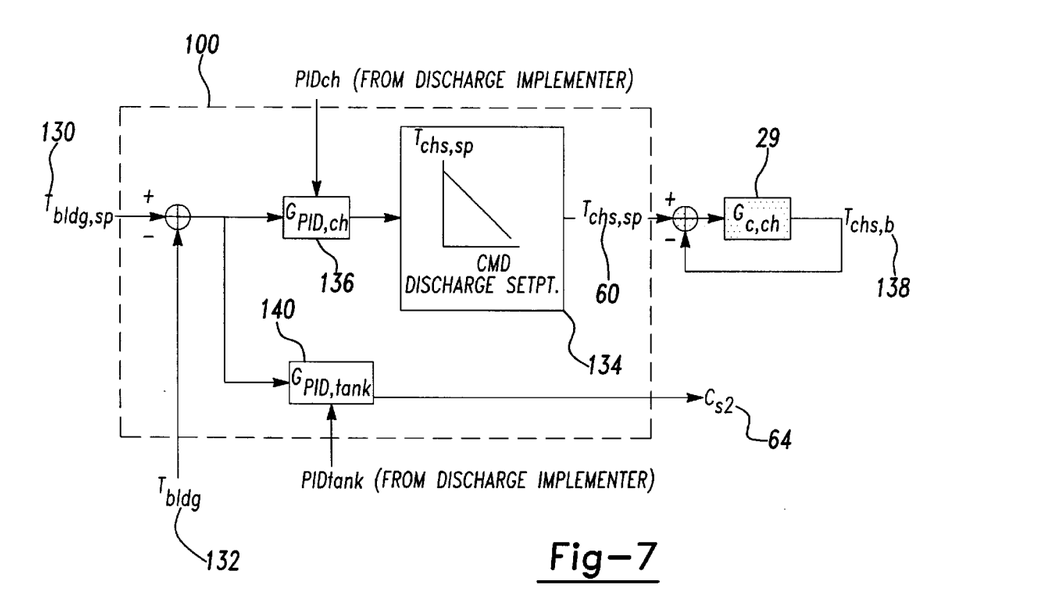
FIG. 7 is a control transfer function diagram representing the PID feedback controller of the knowledge based controller.

Referring to FIG. 7, the chiller PID feedback controller is a feedback controller with a setpoint ($T_{bldg,sp}$) 130 that is the desired building supply temperature. The difference between this setpoint ($T_{bldg,sp}$) and the current building supply temperature ($T_{bldg}$) is provided to a span block 134 which linearly relates a primary controller 136 to the desired chiller setpoint temperature of a secondary controller 29. The secondary controller 29 is a factory installed component from the chiller manufacturer. The secondary loop 138 of the secondary controller 29 modulates the chiller capacity as required to maintain the setpoint temperature.

The limits for the span block 134 are determined by the highest and lowest setpoint temperatures needed by the chiller. These limits are specified by the customer. When the output of the primary feedback controller 136 is at 100 percent, the setpoint for the second controller 29 will be the low limiting value. When the PID feedback controller 136 is set to zero percent, then the setpoint for the secondary controller 29 will be the high limiting value. It should be noted that the PID feedback controller 136 is tuned to provide a slower response than the secondary controller 29. This difference in loop response is required to ensure stability. The secondary controller 29 is typically tuned at the factory.

As with the chiller control, the storage tank PID feedback controller receives the difference between the setpoint ($T_{bldg,sp}$) 130 and the current building supply temperature ($T_{bldg}$) 132. Based upon this difference, the controller 140 of the TES tank controls the position the storage control valve such that flow through the tank is regulated and the discharge rate or charge rate of the TES is controlled. During a charging mode either a binary input or a separate 100% command is issued to the load bypass valve so that the cooling coils (36) are bypassed.

If the output of a PID controller is at maximum (100%) continuously for a predetermined time period (e.g., 10 minutes) its high structure flag is "set". Conversely if the output is at minimum (0%) for the predetermined time period its low structure flag is set. If the controller output is >0 and <100, then no flags are set.

From the foregoing, it can be seen that a real-time pricing controller and corresponding method are provided for controlling an energy storage medium that is connected to an environmental control system. The controller and method minimizes the integrated cost function of a real-time pricing utility service yet is simple to implement, computationally efficient, requires minimal memory, and is robust.

Those skilled in the art can now appreciate from this description that the broad teachings of the present invention can be implemented in a variety of forms. Therefore, the true scope of the invention is vast, and other modifications will become apparent to the skilled practitioner upon a study of the drawings, specification, and following claims.

What is claimed is:

1. A controller for controlling an energy storage medium connected to an environmental control system that is providing environmental conditioning, comprising:
   an energy pricing data structure for storing a real-time energy pricing profile indicative of energy rates corresponding to time-varying production costs of energy;
   a data storage medium containing rules determined during a developmental phase using dynamic programming, said rules matching optimal control trajectories of an energy cost function that is dependent upon said real-time energy pricing profile, said rules governing the operation of the energy storage medium; and
   an engine for generating during an operational phase an energy storage medium control signal based upon said real-time energy pricing profile and said rules, whereby the energy storage medium is controlled with said energy storage medium control signal in order to minimize energy costs associated with environmental conditioning by the environmental control system.

2. The controller of claim 1, further comprising a forecaster that provides an estimate of the facility heat transfer rate to said engine.

3. The controller of claim 1, further comprising facility specific data that is received by said engine and utilized in the generation of said energy storage medium control signal.

4. The controller of claim 1, further comprising a PID feedback controller that receives said energy storage medium control signal from said engine and generates commands for regulation of the energy storage medium.

5. The controller of claim 1, further comprising a PID feedback controller that receives said energy storage medium control signal from said engine and generates commands for regulation of the environmental control system.

6. The controller of claim 1, wherein said engine includes a charge module, standby module, and discharge module that are selected for execution at least in part on a discharge interval.

7. The controller of claim 1, further comprising a plant status selector that transmits a plant status signal to said engine, said plant status signal identifying a charging mode, standby mode, or discharge mode that is to be executed by said engine.

8. The controller of claim 6, wherein said discharge module determines whether use of the energy storage medium should be maximized or minimized for an interval.

9. The controller of claim 6, wherein said discharge module selects a chiller/priority control strategy by which the energy storage medium and environmental control system are operated.

10. The controller of claim 4, wherein said PID feedback controller is a feedback controller having a setpoint that is a desired building supply temperature.

11. The controller of claim 1, wherein said energy cost function is:

$$J_{RTP} = \sum_{K=1}^{S} [Re * P]_K * \Delta t.$$

12. The controller of claim 1, wherein said energy storage medium is an internal melt, ice storage tank.

13. The controller of claim 1, wherein said environmental control system is an air conditioning system.

14. A method of controlling an energy storage medium connected to an environmental control system that is providing environmental conditioning, comprising:
   (a) storing a real-time energy pricing profile in an energy pricing data structure, said real-time pricing profile indicative of energy rates corresponding to time varying production costs of energy;
   (b) governing the operation of the energy storage medium with rules determined during a developmental phase using dynamic programming, said rules matching an optimal control trajectory of an energy cost function that is dependent upon said real-time energy pricing profile; and
   (c) generating during an operational phase an energy storage medium control signal based at least in part upon said energy pricing profile and said rules, whereby the energy storage medium is controlled with the energy storage medium control signal in order to minimize energy costs associated with environmental conditioning by the environmental control system.

15. The method of claim 14, further comprising the step of forecasting a facility heat transfer rate which is utilized to identify a discharge strategy for the energy storage medium.

16. The method of claim 14, wherein step (c) includes selecting a charge mode, standby mode, and discharge mode based at least in part on a discharge interval.

17. The method of claim 14, further comprising the step of determining whether use of the energy storage medium should be maximized or minimized for an interval.

18. The method of claim 14, further comprising the step of selecting a chiller/priority control strategy by which the energy storage medium is operated.

19. The method of claim 14, further comprising the step of selecting a chiller/priority control strategy by which the environmental control system is operated.

20. An environmental control system that provides environmental conditioning of a facility, comprising:
   an air conditioning system;
   a thermal energy storage tank that is used in conjunction with said air conditioning system to cool the facility; and
   a controller that controls said air conditioning system and said thermal energy storage tank, said controller including:
      an energy pricing data structure for storing a real-time energy pricing profile indicative of energy rates corresponding to time-varying production costs of energy,
      a data storage medium containing rules determined during a developmental phase using dynamic programming, said rules matching optimal control trajectories of an energy cost function that is dependent upon said real-time energy pricing profile, said rules governing the operation of said thermal energy storage tank, and
      an engine for generating during an operational phase a control signal based upon said real-time energy pricing profile and said rules, whereby energy costs associated with the environmental conditioning of the facility are minimized.

21. A controller for controlling an energy storage medium connected to an environmental control system that is providing environmental conditioning, comprising:
   an energy pricing data structure for storing a real-time energy pricing profile indicative of energy rates corresponding to time-varying production costs of energy;
   a data storage medium containing rules determined using dynamic programming, said rules matching optimal control trajectories of an energy cost function that is dependent upon said real-time energy pricing profile, said rules governing the operation of the energy storage medium; and
   an engine for generating an energy storage medium control signal based upon said real-time energy pricing profile and said rules, whereby the energy storage medium is controlled with said energy storage medium control signal in order to minimize energy costs associated with environmental conditioning by the environmental control system,
   wherein the controller operates with a hybrid control algorithm having a finite number of discrete states and also allowing, within at least one state, continuous control.

22. The controller of claim 21, wherein said rules comprise discharging rules that include:
   discharging the energy storage medium during a first time interval in which an energy cost rate is at a maximum as determined by the real-time energy pricing profile, and
   discharging the energy storage medium during a subsequent high energy cost interval, so long as the energy storage medium is not depleted and the environmental conditioning continues to be necessary,
   wherein the discharging during the first time interval and the discharging during the subsequent high energy cost interval occur at rates which maximize the energy output of the energy storage medium during each interval while maintaining sufficient energy within the energy storage medium so that later energy demands of the environmental control system as predicted by a forecaster can be met.

23. The controller of claim 21, wherein said rules comprise charging rules that include:
   always charging the energy storage medium at a maximum rate;
   charging the energy storage medium only during a customer specified charging period; and
   ceasing the charging of the energy storage medium if the energy storage medium is charged to a maximum specified limit.

24. A method of controlling an energy storage medium connected to an environmental control system that is providing environmental conditioning, comprising:
   (a) storing a real-time energy pricing profile in an energy pricing data structure, said real-time pricing profile indicative of energy rates corresponding to time varying production costs of energy;
   (b) governing the operation of the energy storage medium with rules determined using dynamic programming, said rules matching an optimal control trajectory of an energy cost function that is dependent upon said real-time energy pricing profile; and
   (c) generating an energy storage medium control signal based at least in part upon said energy pricing profile and said rules, whereby the energy storage medium is controlled with the energy storage medium control signal in order to minimize energy costs associated with environmental conditioning by the environmental control system,
   wherein said rules further comprise charging rules that include:
      always charging the energy storage medium at a maximum rate;
      charging the energy storage medium only during a customer specified charging period; and
      ceasing the charging of the energy storage medium if the energy storage medium is charged to a maximum specified limit.

25. The method of claim 24, wherein said rules further comprise discharging rules that include:
   discharging the energy storage medium during a first time interval in which an energy cost rate is at a maximum as determined by the real-time energy pricing profile, and
   discharging the energy storage medium during a subsequent high energy cost interval, so long as the energy storage medium is not depleted and the environmental conditioning continues to be necessary, wherein the discharging during the first time interval and the discharging during the subsequent high energy cost interval occur at rates which maximize the energy output of the energy storage medium during each interval while maintaining sufficient energy within the energy storage medium so that later energy demands of the environmental control system as predicted by a forecasting can be met.

* * * * *